Jan. 30, 1923.  1,443,578
C. E. KLINE.
CORNER CLAMP FOR FRAMES.
FILED APR. 1, 1921.
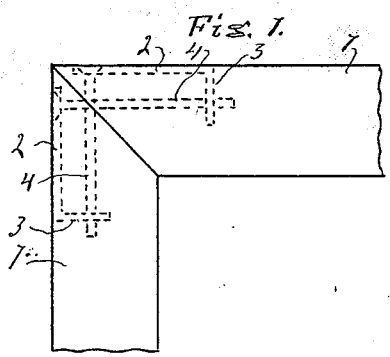
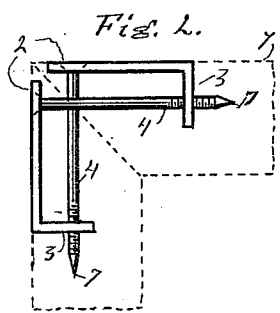
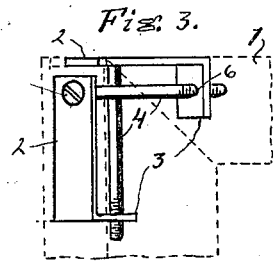
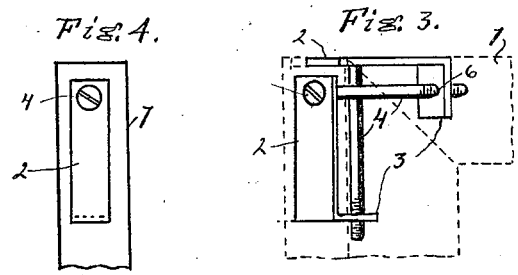
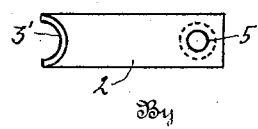
Inventor
Charles E. Kline,
By
Attorney Patented Jan. 30, 1923.

1,443,578

UNITED STATES PATENT OFFICE.

CHARLES E. KLINE, OF CEDAR SPRINGS, MICHIGAN.

CORNER CLAMP FOR FRAMES.

Application filed April 1, 1921. Serial No. 457,576.

*To all whom it may concern:*

Be it known that I, CHARLES E. KLINE, a citizen of the United States, residing at Cedar Springs, in the county of Kent and State of Michigan, have invented certain new and useful Improvements in Corner Clamps for Frames, of which the following is a specification.

My invention relates to improvements in fastening devices for mitered corners, such as for picture frame construction, box corners, and other lines of corner construction, and its objects are: First, to provide a cheap but effective means for positively securing such corners; second, to provide a means wherewith such corners may be adjusted to meet any shrinkage of the timber that may take place after construction; and, third, to provide a means whereby the mitered corner construction may be as permanent as an integral corner could be.

I attain these objects by the mechanism and construction shown in the accompanying drawing, in which Fig. 1 is an elevation of one corner of a frame with my appliance shown in outline. Fig. 2 is a like view showing the frame in outline, and my implements in place therein but shown in solid lines. Fig. 3 is a perspective of my device, with the frame shown in outline. Fig. 4 is an edge elevation of one corner of a frame with one part of my device in place, showing the position of the securing bolt, and Fig. 5 is a back plan of the clamping plate showing a modified form of resistance plate, or arm.

Similar reference characters indicate similar parts throughout the several views.

In the construction of this frame corner retainer I make use of sheet metal strips or plates, each having a body portion, 2, and a right angled portion 3. I embed a metal body 2 in each of the frame members 1, as indicated by the dotted lines, especially in Fig. 1, but likewise indicated in Figs. 2 and 3, with the right angled arm 3 disposed in a mortise in the frame member in such a position that a bolt 4, passing through the end of one of said plates, two being used at each corner of the frame, will pass into, and be screwed through the screw threaded hole in the arm 3 of the other plate so that the wood at the end of the members 1 of the frame, will be drawn solidly together, in both directions; that is in directions at right angles to each other, as plainly indicated in Fig. 1, and as plainly shown in Figs. 2 and 3. In Fig. 5, 5 represents the hole through the body 2 of the clamping plate, and in Fig. 3, 6 represents a like hole through the arm 3 that is screw threaded to receive the screw threaded end of one of the bolts 4.

I prefer that the points or ends of the bolts within the frame material 1 be made sharp, as at 7 in Fig. 2, as by this means it is much easier to make them to enter and be screwed through the holes 6 in the arms 3, but they may be made of any desired or convenient form for ready application.

It is necessary, of course, for these plates to be so punctured, as at 5 and 6, that when the bolts 4 are in place they may pass each other, as shown in Figs. 2 and 3.

In Figs. 1, 2 and 3 I have shown the arms 3 as made of the sheet metal bent at right angles without further preparation, but with this form it is a little difficult to form the mortise in the frame for the reception of these arms, it being necessary to either bore several holes to obtain the proper width or length of mortise, and to overcome this extra work and loss of time I have provided for boring a single hole into the frame sides for the reception of the semicircular arm 3′. I am somewhat prejudiced in favor of this form of arm as with its use a single hole, as hereinbefore intimated, will suffice for the reception of the arm, and, with this form a much greater bearing surface is provided than if the flat arm 3 is used, and the balance of the hole may be filled with wood, putty or other suitable material. It will be readily understood that this form of arm may be made upon an ordinary machine press, with the proper dies therefor.

Having thus fully described my invention, what I claim as new in the art, is:

1. A corner clamp for frame construction consisting of a pair of plates and means for securing said plates together at right angles with each other at the corner of a frame, each plate comprising an apertured body portion and an apertured arm perpendicular thereto, the arm of each plate being disposed opposite the body portion of the other plate, and the aperture in each plate being out of alinement with the aperture in the other body portion but in alinement with the aperture in the opposite arm whereby the securing means may be passed through the apertures in the respective body portions and into the apertures in the opposite arms without danger of either of said securing elements interfering with the other securing element.

2. A corner clamp for frame construction, comprising a pair of sheet metal plates adapted to be placed upon the outer edges of a corner of the frame, each plate having an arm formed perpendicular thereto adapted to be set into a member of said frame and having a screw threaded hole through each arm, each plate having a hole through it near its plain end, a bolt adapted to be passed through the hole in the plain end of each plate and screwed into the hole in the arm of the opposite plate to bind the members of the frame firmly together at the corners of the frame.

3. In frame construction, a corner clamp comprising a sheet metal plate embedded into the outer edge of each frame member, an arcuate arm integral with and perpendicular to each metal plate and extended into the adjacent frame member, the plates and the arms having holes through them with the holes through the arms screw threaded, and a bolt passed through the hole in each plate and screwed through the hole in the opposite arm to draw the frame members firmly together at the corner of the frame.

Signed at Grand Rapids, Michigan, March 28, 1921.

CHARLES E. KLINE.